(12) United States Patent
Naoki et al.

(10) Patent No.: US 7,457,083 B2
(45) Date of Patent: Nov. 25, 2008

(54) MAGNETIC DISK DRIVE WITH MECHANISM TO SUPPRESS VIBRATION OF WIRING EXTENSION

(75) Inventors: Maeda Naoki, Kanagawa-ken (JP);
Hagiya Shinobu, Kanagawa-ken (JP);
Nakamura Shigeo, Kanagawa-ken (JP);
Takahashi Haruhide, Kanagawa-ken (JP); Sega Masahiko, Kanagawa-ken (JP); Wakatsuki Kousaku, Kanagawa-ken (JP)

(73) Assignee: Hitachi Global Storage Technologies Netherlands B.V., AZ Amsterdam (NL)

( * ) Notice: Subject to any disclaimer, the term of this patent is extended or adjusted under 35 U.S.C. 154(b) by 593 days.

(21) Appl. No.: 11/066,965

(22) Filed: Feb. 25, 2005

(65) Prior Publication Data
US 2005/0190503 A1  Sep. 1, 2005

(30) Foreign Application Priority Data
Feb. 27, 2004  (JP)  ............................. 2004-053887

(51) Int. Cl.
*G11B 5/48* (2006.01)
(52) U.S. Cl. .................................................. 360/245.9
(58) Field of Classification Search .............. 360/245.9, 360/264.2, 265.7, 266.3
See application file for complete search history.

(56) References Cited
U.S. PATENT DOCUMENTS 5,677,815 A * 10/1997 Chan ....................... 360/265.7
5,691,861 A * 11/1997 Ohba ....................... 360/245.8
5,831,788 A * 11/1998 Hofland ..................... 360/97.01
6,046,886 A * 4/2000 Himes et al. ............. 360/245.9
6,075,674 A * 6/2000 Aoyagi et al. ............ 360/245.8
6,751,066 B1 * 6/2004 Warmka et al. .......... 360/245.8
6,754,045 B2 * 6/2004 Korkowski et al. ........ 360/245.9
7,023,665 B2 * 4/2006 Riener ..................... 360/245.9

FOREIGN PATENT DOCUMENTS

JP        09-161251        6/1997

* cited by examiner

*Primary Examiner*—Angel A. Castro
(74) *Attorney, Agent, or Firm*—Townsend and Townsend and Crew LLP; John Henkhaus

(57) ABSTRACT

Due to the raised operating rotation speed, it has become an important technical theme to reduce fluid vibrations caused by high speed air flows passing the wiring extension in a head gimbal assembly in order to raise the positioning accuracy for higher density recording. Embodiments of the present invention provide a spring structure to the wiring extension. In a wiring extension holding section formed on the carriage side, the wiring extension is retained at the center of the groove of the holding section by the repulsive force of spring members. By preventing the wiring extension from being directly subject to high speed air flows generated by a high-speed rotating disk, this structure is intended to suppress vibrations of the wiring extension caused by high-speed air flows passing the wiring extension.

18 Claims, 4 Drawing Sheets

MAGNETIC DISK DRIVE WITH MECHANISM TO SUPPRESS VIBRATION OF WIRING EXTENSION

CROSS-REFERENCES TO RELATED APPLICATIONS

This application claims priority from Japanese Patent Application No. JP2004-053887, filed Feb. 27, 2004, the entire disclosure of which is incorporated herein by reference.

BACKGROUND OF THE INVENTION

The present invention relates to disk drives having flying type heads such as magnetic disk drives, optical disk drives and magnetic optical disk drives and, in particular to a magnetic disk drive including a load beam which holds a head slider at its one end, which is formed integrally with a wiring pattern, and which has a wiring extension of the wiring pattern.

With advance of the transfer rate due to the increasing recording density, the shape of the so-called head gimbal assembly wherein a load beam bearing a head slider is assembled with signal-conveying wires has shifted to the long tail type from the conventional short tail type. The short tail type has a short wiring extension whereas the long tail type has both a wiring pattern and a long wiring extension integrated thereto. In addition, due to the raised operating rotation speed, it has become an important technical theme to reduce fluid vibrations caused by high speed air flows passing the wiring extension in order to raise the positioning accuracy for higher density recording.

In conjunction with this technical field, a structure employing a wiring pattern-integrated load beam is disclosed in Japanese Patent Laid-open No. 9-161251. In this structure, a convex or step portion is formed along a side face of the guide arm so as to provide a plane parallel to the load beam-mounting plane. In addition, the extension wiring pattern is bonded onto the parallel plane provided by the convex or step portion.

BRIEF SUMMARY OF THE INVENTION

However, such a structure mentioned above as the background art has the following problems.

(1) Magnetic disk drives in server systems are typically required to operate in a temperature range from 5 to 55° C. In the case of mobile and on-vehicle ones, they must operate in a still wider temperature range typically from −20 to 80° C. Usually, aluminum is used to form the aforementioned guide arm in order to reduce the weight whereas stainless steel is used to form the load beam and wiring extension (tale portion). Thus, the difference of thermal expansion between these materials is not negligible over such a wide temperature range. In particular, in the case of the structure mentioned above as a background art, since the wiring extension is bonded to the guide arm, the bimetal effect causes deformation, resulting in deterioration in the positioning accuracy.

(2) Generally, if a problem is found in the electrical characteristics of a head in the process of manufacture of a magnetic disk drive, the head is repaired. In the case of the aforementioned conventional structure, however, the wiring extension is bonded to the guide arm without taking the efficiency of repair operation into consideration.

To solve the above-mentioned problems, according to an aspect of the present invention, there is provided a magnetic disk drive comprising: a magnetic disk fixed to a rotatably held rotation shaft; a magnetic head slider which is faced to the disk so as to write and read arbitrary information; a load beam which bears the magnetic head slider at one end thereof and has a wiring pattern integrated thereto; a base plate which holds the other end of the load beam; a guide arm which fixes and holds the base plate; a pivoting axis which pivotally bears the guide arm; and a voice coil motor which drives the pivoting axis. The wiring pattern integrated to the load beam comprises an extension which is a wiring extension extended to an end of a side face of the guide arm. The guide arm comprises a wiring extension holding section along the side face to hold the wiring extension, and a mechanism configured to give force to the wiring extension in a direction of the depth of the guide arm is provided at a position where the wiring extension holding section is vertically faced to the wiring extension.

In one embodiment, the mechanism to give force to the wiring extension in a direction of the depth of the guide arm is provided on the wiring extension. In another embodiment, the mechanism to give force to the wiring extension in a direction of the depth of the guide arm is provided on the wiring extension holding section. In yet another embodiment, the mechanism to give force to the wiring extension in a direction of the depth of the guide arm is an elastic structure formed by partially making the wiring extension convex.

In some embodiments, a pressuring part of the force giving mechanism formed at the wiring extension is pressed from an outer side thereof and is formed to curve. The wiring extension provided with the force giving means is movable in the wiring extension holding section along the side face of the guide arm. The mechanism to give force to the wiring extension is provided at least at a position where a natural vibration mode frequency of the wiring extension is separate from an internal natural frequency of the magnetic disk drive. The mechanism to give force to the wiring extension comprises a damping material.

According to embodiments of the present invention, it is possible to provide a higher positioning accuracy magnetic disk drive by reducing the fluid dynamics influence on the wiring extension of the head gimbal assembly so as to suppress vibrations of the wiring extension.

In addition, since the wiring extension held in the wiring extension holding section formed along the side face of the guide arm is given flexibility or mobility in the length direction and the height direction, it is possible to absorb the difference of thermal expansion between the guide arm and the wiring extension, which prevents the bimetal effect from causing deformation. Furthermore, since the wiring extension is held in the wiring extension holding section along the side face of the guide arm by utilizing the spring property of the wiring extension, the attaching and removing operations can be done easily for repair.

DETAILED DESCRIPTION OF THE INVENTION

Embodiments of the present invention will be described below with reference to the drawings.

Figure 1:
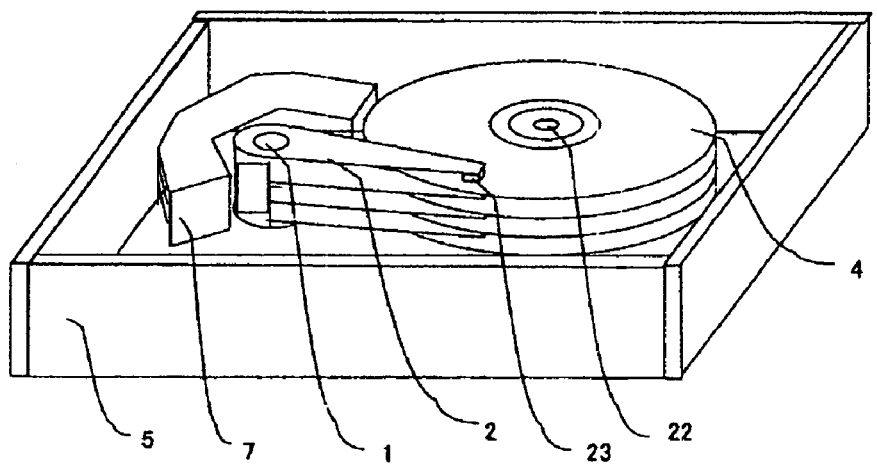
FIG. 1 shows a general structure of a magnetic disk drive.

FIG. 1 shows a general structure of a magnetic disk drive. The disk drive includes: magnetic disks 4 fixed to a rotatably held rotation shaft 22; magnetic head sliders 23 faced to the respective disks 4 so as to write and read arbitrary information; load beams 3 (refer to FIG. 2) each having a wiring pattern integrated thereto and bearing the magnetic head slider 23 at one end; a base plate 8 holding the other end of the load beam 3; guide arms 2 each fixing and holding the base plate 8; a pivoting axis 1 which pivotally bears the guide arms 2; and a voice coil motor 7 which drives the pivoting axis 1.

Figure 2:
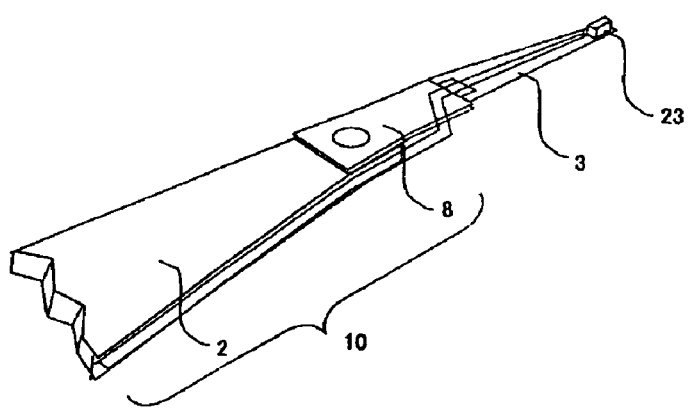
FIG. 2 shows a partial configuration of a guide arm and a head gimbal assembly.
Figure 3:
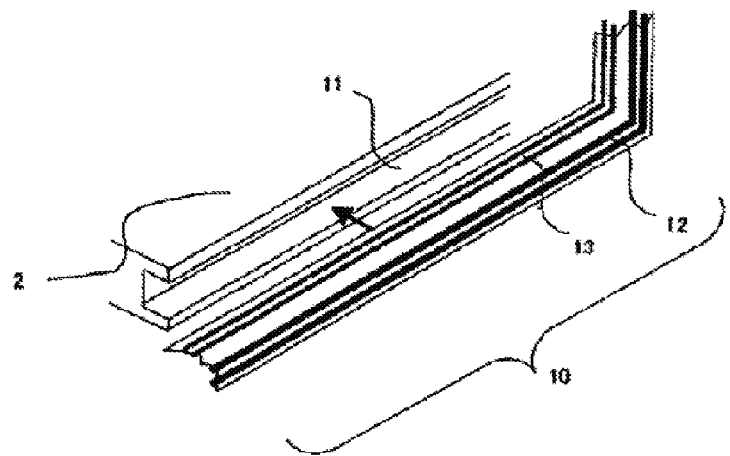
FIG. 3 is a partial view showing the configuration of a wiring extension holding section of a guide arm.

FIG. 2 shows a partial configuration of the guide arm and the head gimbal assembly. The head gimbal assembly includes the extension of a wiring pattern, i.e., a wiring extension 10 held along a side face of the guide arm 2. FIG. 3 shows the configuration of a wiring extension holding section 11 formed along the side face of the guide arm 2. A write wiring pattern 12 and a read wiring pattern 13 are integrated on the wiring extension 10 which is inserted into the wiring extension holding section 11 (described as a groove in this figure) formed along the side face of the guide arm 2. In the magnetic disk drive, high speed air flows are caused by the rotating disk 4 (refer to FIG. 1). The guide arm 2, the head gimbal assembly including the load beam 3 and the wiring extension 10 are given fluid vibrations when these high-speed gas flows pass them. Influenced by the fluid vibrations, the positioning of the head slider 23 on the disk 4 may be deteriorated in accuracy. To realize high recording density, preventing this positioning accuracy deterioration due to fluid vibrations has become a theme of importance. In particular, in most of the recent magnetic disk drives, the wiring extension 10 is employed in the head gimbal assembly including the load beam 3. The present invention provides a solution to reduce the fluid vibrations of this wiring extension 10.

Figure 4:
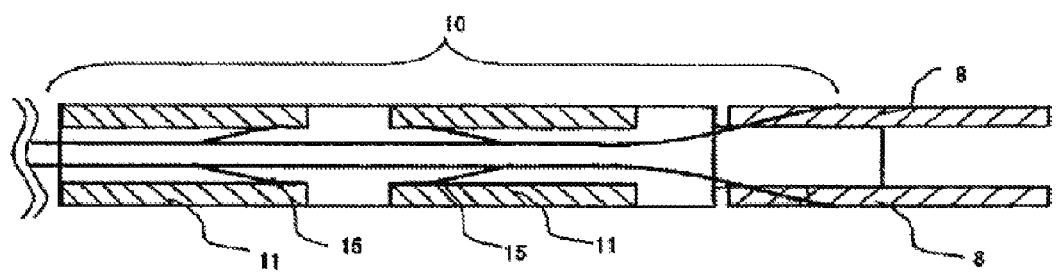
FIG. 4 is a side view of a mechanism configured to give force to a wiring extension according to an embodiment of the present invention.
Figure 5:
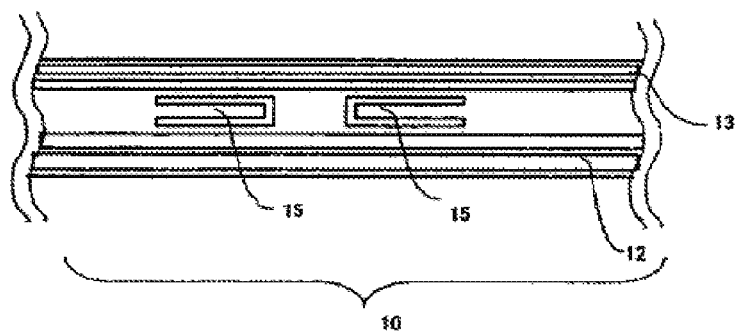
FIG. 5 is a detailed top view of the mechanism configured to give force to the wiring extension according to the embodiment of the present invention.

FIG. 4 is a side view of the configuration of a mechanism configured to give force to a wiring extension according to an embodiment of the present invention. FIG. 5 is a top view of the mechanism configured to give force to the wiring extension according to the embodiment of the present invention.

A head gimbal assembly including a load beam 3 has a wiring extension 10 which is the extension of a wiring pattern. The wiring extension 10 is held along a side face of a guide arm 2. The mechanism 15 gives force to the wiring extension 10 toward the center of the wiring extension holding section 11 formed along the side face of the guide arm 2, that is, in the depth direction of the guide arm 2. The mechanism 15 is set where the wiring extension holding section 11 is faced vertically to the wiring extension 10. By giving force to this wiring extension 10, it is possible not only to retain the wiring extension at or near the center of the wiring extension holding section 11 in the depth direction but also to suppress fluid dynamics vibrations of the wiring extension 10 since the influence of the fluid dynamics force caused by high speed air flows passing nearby is reduced. As a result, it is possible to provide a high accuracy magnetic disk drive without deterioration in the positioning accuracy of the head slider 23. The force-giving mechanism 15 can easily be prepared by etching if the material is, for example, stainless steel that is also used to construct the wiring extension 10. In addition, the force-giving mechanism 15 can easily be shaped by press working when the suspension is fabricated or when the head gimbal assembly including the load beam 3 is fabricated.

Figure 6:
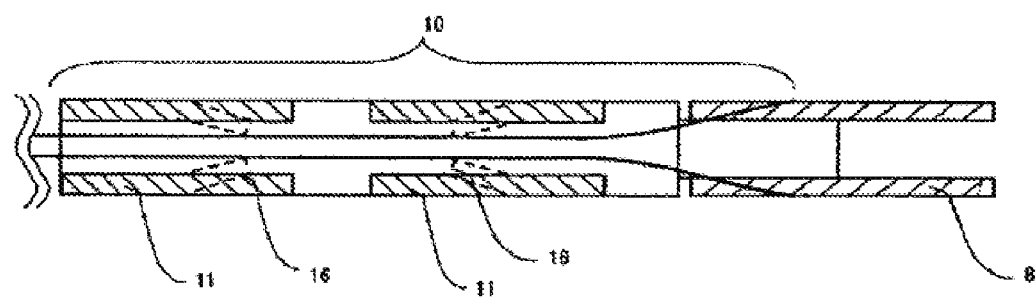
FIG. 6 is a detailed side view of a mechanism configured to give force to a wiring extension according to another embodiment of the present invention.

FIG. 6 is a detailed side view of the mechanism configured to give force to a wiring extension 10 according to another embodiment of the present invention. Set in a wiring extension holding section 11 formed along a side face of a guide arm 2, the mechanism 16 gives force to the wiring extension 10 toward the center of the wiring extension holding section 11, that is, in the depth direction of the guide arm 2. Similar to the other embodiments, this embodiment also has the effect of suppressing deterioration in the positioning accuracy due to fluid vibrations by minimizing the influence of high-speed air flows passing around the wiring extension 10. By using a resin or a lubricant material to form the wiring extension holding section 11 along the side face of the guide arm 2, it is possible to further sufficiently raise the mobility of the wiring extension 10 in the length direction to cope with the difference of thermal expansion between the wiring extension 10 and the guide arm 2. In addition, this facilitates the prevention of dust which may be generated due the longitudinal friction between the guide arm 2 and the wiring extension 10. A similar effect can also be obtained by adding the aforementioned resin or lubricant material to the wiring extension 10 or each force-giving mechanism 15 at least at a portion in contact with the wiring extension holding section 11.

Figure 7:
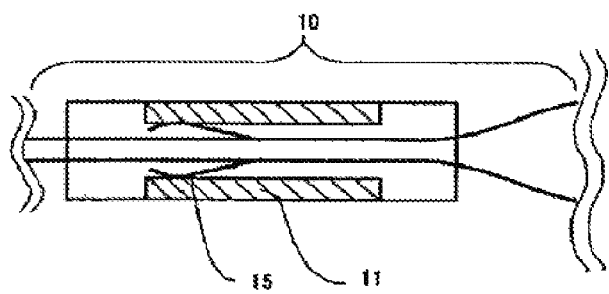
FIG. 7 is a detailed side view of a mechanism configured to give force to a wiring extension according to another embodiment of the present invention.

FIG. 7 provides a detailed side view of the mechanism configured to give force to a wiring extension 10 in another embodiment of the present invention. The mechanism 15 to give force to the wiring extension 10 toward the center of a wiring extension holding section formed along a side face of a guide arm 2, that is, in the depth direction of the guide arm 2 is an elastic convex structure formed by partly using the wiring extension 10. The convex of the force-giving mechanism 15 on the wiring extension 10 is curved by pressing it from the outer side. This easily makes it possible to secure mobility in the length direction of the guide arm 2 and therefore to suppress dust generation due to the movement of the wiring extension 10.

In this embodiment according to the present invention, the wiring extension 10 is held in the wiring extension holding section 11 formed along the side face of the guide arm 2 with flexibility or mobility in the length direction and the height direction. It is therefore possible to absorb the difference of thermal expansion between the guide arm 2 and the wiring extension 10, which prevents the bimetal effect from causing deformation. In addition, since the wiring extension 10 is held in the wiring extension holding section 11 along the side face of the guide arm by utilizing the spring property of the wiring extension 10, the attaching and removing operations can be done easily for repair.

Figure 8:
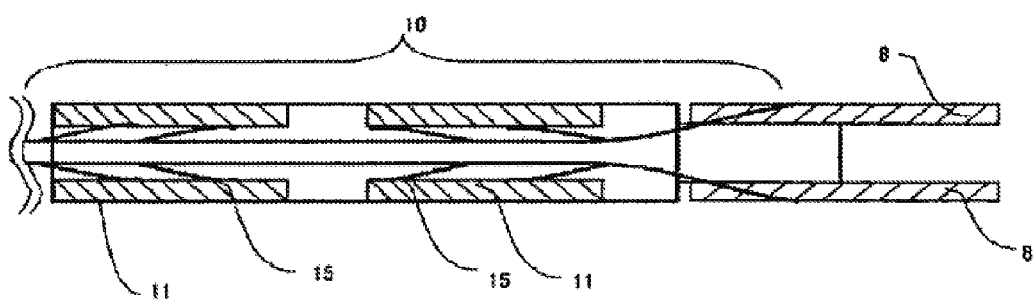
FIG. 8 is a side view of a mechanism configured to give force to a wiring extension according to another embodiment of the present invention.

FIG. 8 is a side view of the mechanism 15 configured to give force to a wiring extension 10 according to another embodiment of the present invention. This embodiment is characterized in that a plurality of force-giving mechanism 15 are provided in the wiring extension 10. If the wiring extension 10 is partly composed of stainless steel, the frequency of natural mode vibration similar to that of string vibration falls apparently within the control frequency range of the magnetic disk drive. Accordingly, it is important in design to arrange the force-giving mechanism 15 at positions where the natural frequency of the wiring extension 10 is separate from the internal natural frequency of the magnetic disk drive. If the force-giving mechanism 15 are formed in plural areas as shown in FIG. 8, it is possible to raise robustness against resonance as well as retaining the wiring extension 10 at or near the center of the guide arm 2 in the depth direction. This makes it possible to provide a magnetic disk drive having a high degree of positioning accuracy and high recording density by suppressing the excitation of fluid vibrations due to high-speed air flows passing nearby.

Figure 9:
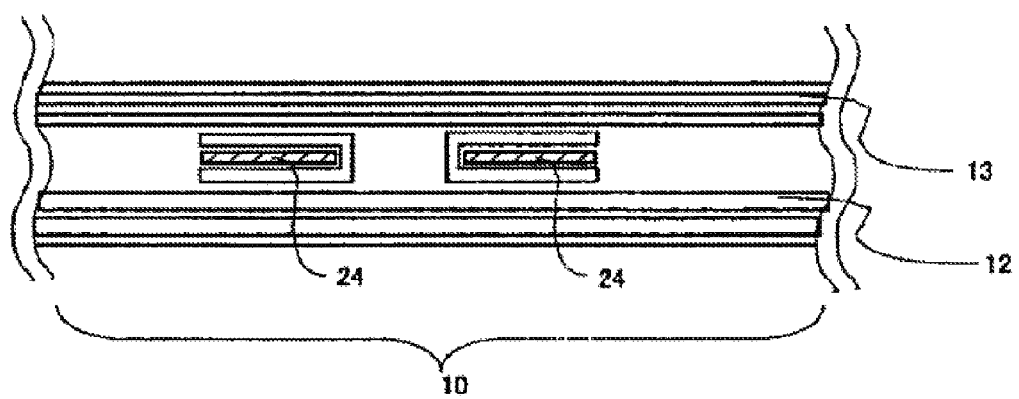
FIG. 9 is a side view of a mechanism configured to give force to a wiring extension according to another embodiment of the present invention.

FIG. 9 is a side view of a mechanism 15 configured to give force to a wiring extension 10 according to another embodiment of the present invention. Since a damping mechanism 24 having a damping effect is added to the force-giving mechanism 15 as a method to prevent resonance and suppress fluid vibrations, each force-giving mechanism 15 has substantially the same effect as shown in FIG. 8. Needles to say, this effect can be raised further if the force-giving mechanism 15 having the damping mechanism 24 are formed in a plurality of areas. In this embodiment according to the present invention, it is possible to raise robustness against resonance as well as retain the wiring extension 10 at or near the center of the guide arm 2 in the depth direction. This makes it possible to provide a magnetic disk drive having a high degree of positioning accuracy and high recording density by suppressing the excitation of fluid dynamics vibrations due to high speed air flows passing nearby. The damping mechanism 24 can be formed effectively by using a polyimide material widely used as a dielectric material for wiring patterns or a viscous-elastic material also widely used as a vibration damping material. A combination of a viscous-elastic material and a constraint stainless steel or polyimide plate is also appropriate.

It is to be understood that the above description is intended to be illustrative and not restrictive. Many embodiments will be apparent to those of skill in the art upon reviewing the above description. The scope of the invention should, therefore, be determined not with reference to the above description, but instead should be determined with reference to the appended claims alone with their full scope of equivalents.

What is claimed is:

1. A magnetic disk drive comprising:
   a magnetic disk fixed to a rotatably held rotation shaft;
   a magnetic head slider which is faced to the disk so as to write and read information;
   a load beam which bears the magnetic head slider at one end thereof and has a wiring pattern integrated thereto;
   a guide arm which fixes and holds the other end of the load beam, the wiring pattern integrated to the load beam and comprising a wiring extension extended to an end of a side face of the guide arm, the guide arm comprising a wiring extension holding section along the side face to hold the wiring extension;
   a pivoting axis which pivotally bears the guide arm;
   a voice coil motor which drives the pivoting axis; and
   a mechanism provided within the wiring extension holding section and configured to give force to the wiring extentsion in a direction of a depth of the guide arm and disposed at a position where the wiring extension holding section is vertically faced to the wiring extension.

2. A magnetic disk drive according to claim 1, wherein the mechanism to give force to the wiring extension in a direction of the depth of the guide arm is provided on the wiring extension.

3. A magnetic disk drive according to claim 2, wherein the mechanism to give force to the wiring extension in a direction of the depth of the guide arm comprises an elastic structure formed by partially making the wiring extension convex.

4. A magnetic disk drive according to claim 3, wherein a pressuring part of the force giving mechanism formed at the wiring extension is pressed from an outer side thereof and is formed to curve.

5. A magnetic disk drive according to claim 2, wherein the wiring extension provided with the force giving mechanism is movable in the wiring extension holding section along the side face of the guide arm.

6. A magnetic disk drive according to claim 1, wherein the mechanism to give force to the wiring extension is provided at at least one position where a natural vibration mode frequency of the wiring extension is separate from an internal natural frequency of the magnetic disk drive.

7. A magnetic disk drive according to claim 1, wherein the mechanism to give force to the wiring extension comprises a damping material.

8. A magnetic side drive according to claim 7, wherein the damping material comprises a polyimide material or a combination of a viscous-elastic material and a constraint stainless steel or polyimide plate.

9. A magnetic disk drive according to claim 1, wherein the wiring extension holding section comprises a resin or a lubricant material.

10. A magnetic disk drive according to claim 1, wherein the wiring extension comprises a resin or a lubricant material.

11. A magnetic disk drive according to claim 1, wherein the guide arm fixes and holds a base plate which holds the other end of the load beam.

12. A magnetic disk drive comprising:
    a magnetic disk fixed to a rotatably held rotation shaft;
    a magnetic head slider which is faced to the disk so as to write and read information;
    a load beam which bears the magnetic head slider at one end thereof and has a wiring pattern integrated thereto;
    a guide arm which fixes and holds the other end of the load beam, the wiring pattern integrated to the load beam and comprising a wiring extension extended to an end of a side face of the guide arm, the guide arm comprising a wiring extension holding section along the side face to hold the wiring extension;
    a pivoting axis which pivotally bears the guide arm;
    a voice coil motor which drives the pivoting axis; and
    means, provided within the wiring extentsion holding section and disposed at a position where the wiring extension holding section is vertically faced to the wiring extension, for giving force to the wiring extension in a direction of a depth of the guide arm.

13. A magnetic disk drive according to claim 12, wherein the means for giving force to the wiring extension in a direction of the depth of the guide arm is provided on the wiring extension.

14. A magnetic disk drive according to claim 13, wherein the wiring extension provided with the force giving means is movable in the wiring extension holding section along the side face of the guide arm.

15. A magnetic disk drive according to claim 12, wherein the means for giving force to the wiring extension is provided at at least one position where a natural vibration mode frequency of the wiring extension is separate from an internal natural frequency of the magnetic disk drive.

16. A magnetic disk drive according to claim 12, wherein the means for giving force to the wiring extension comprises damping means.

17. A magnetic disk drive according to claim 12, wherein the wiring extension holding section comprises a resin or a lubricant material.

18. A magnetic disk drive according to claim 12, wherein the wiring extension comprises a resin or a lubricant material.

* * * * *

UNITED STATES PATENT AND TRADEMARK OFFICE
CERTIFICATE OF CORRECTION

| | |
|---|---|
| PATENT NO. | : 7,457,083 B2 |
| APPLICATION NO. | : 11/066965 |
| DATED | : November 25, 2008 |
| INVENTOR(S) | : Naoki Maeda et al. |

It is certified that error appears in the above-identified patent and that said Letters Patent is hereby corrected as shown below:

Claim 1, column 5, line 46, please delete "extentsion", and insert -- extension --.

Claim 12, column 6, lines 37, please delete "extentsion", and insert -- extension --.

Signed and Sealed this

Twenty-seventh Day of January, 2009

JOHN DOLL
*Acting Director of the United States Patent and Trademark Office*